US011035472B2

United States Patent
Morinaka

(10) Patent No.: US 11,035,472 B2
(45) Date of Patent: **\*Jun. 15, 2021**

(54) LABYRINTH SEAL

(71) Applicant: KOBE STEEL, LTD., Hyogo (JP)

(72) Inventor: Shunsuke Morinaka, Hyogo (JP)

(73) Assignee: KOBE STEEL, LTD., Hyogo (JP)

( * ) Notice: Subject to any disclaimer, the term of this patent is extended or adjusted under 35 U.S.C. 154(b) by 349 days.

This patent is subject to a terminal disclaimer.

(21) Appl. No.: 16/311,466

(22) PCT Filed: Jun. 13, 2017

(86) PCT No.: PCT/JP2017/021830
§ 371 (c)(1),
(2) Date: Dec. 19, 2018

(87) PCT Pub. No.: WO2017/221771
PCT Pub. Date: Dec. 28, 2017

(65) Prior Publication Data
US 2019/0186637 A1  Jun. 20, 2019

(30) Foreign Application Priority Data

Jun. 22, 2016  (JP) .............................. JP2016-123329

(51) Int. Cl.
  *F16J 15/447*  (2006.01)
  *F01D 11/02*  (2006.01)
  *F02C 7/28*  (2006.01)
(52) U.S. Cl.
  CPC .......... *F16J 15/4476* (2013.01); *F01D 11/02* (2013.01); *F16J 15/447* (2013.01); *F02C 7/28* (2013.01); *F05D 2240/55* (2013.01)

(58) Field of Classification Search
  CPC ...... F01D 11/02; F16J 15/4472; F16J 15/447; F16J 15/3288; F05D 2240/55; F05D 2240/56; F02C 7/28
  See application file for complete search history.

(56) References Cited

U.S. PATENT DOCUMENTS 1,756,958 A * 5/1930 Schmidt .................. F01D 11/02
                                                     415/131
2,123,818 A * 7/1938 Wegmann ............ F16J 15/4472
                                                     277/419

(Continued)

FOREIGN PATENT DOCUMENTS

DE      3940607 A1    6/1990
DE   60116966 T2    10/2006

(Continued)

OTHER PUBLICATIONS

International Search Report issued in PCT/JP2017/021830; dated Sep. 19, 2017.

(Continued)

*Primary Examiner* — Nicholas L Foster
(74) *Attorney, Agent, or Firm* — Studebaker & Brackett PC

(57) ABSTRACT

A labyrinth seal is included in a rotary machine. The rotary machine includes a first member, a second member facing the first member, and a gap formed between the first member and the second member. The labyrinth seal includes a step portion, a high-pressure-side fin on the high-pressure side relative to the step portion, a low-pressure-side fin on the low-pressure side relative to the step portion, and an annular groove. The step portion is configured to allow a portion of the second member on the low-pressure side relative to be arranged closer to the other side of the facing direction than a portion of the second member on the high-pressure side. The annular groove is arranged in at least a part of a region (Continued)

on the low-pressure side and on the high-pressure side, relative to the low-pressure-side fin.

20 Claims, 9 Drawing Sheets

(56) References Cited

U.S. PATENT DOCUMENTS

| | | | | |
|---|---|---|---|---|
| 3,231,285 | A * | 1/1966 | Weltmer | F16J 15/4472 277/418 |
| 5,029,876 | A * | 7/1991 | Orlando | F16J 15/4472 277/419 |
| 5,244,216 | A * | 9/1993 | Rhode | F16J 15/4472 277/303 |
| 5,639,095 | A * | 6/1997 | Rhode | F16J 15/4472 277/303 |
| 6,467,773 | B1 | 10/2002 | Rinaldo | |
| 9,650,907 | B2 * | 5/2017 | Bricaud | F01D 11/02 |
| 10,281,046 | B2 * | 5/2019 | Daussin | F16J 15/4472 |
| 10,570,768 | B2 * | 2/2020 | Morinaka | F04D 29/10 |
| 2003/0030223 | A1 | 2/2003 | Rinaldo | |
| 2011/0250073 | A1 * | 10/2011 | Neeli | F01D 11/001 416/223 R |
| 2012/0027582 | A1 * | 2/2012 | Natarajan | F16J 15/46 415/229 |
| 2012/0321449 | A1 | 12/2012 | Matsumoto et al. | |
| 2018/0156337 | A1 * | 6/2018 | Daussin | F16J 15/4472 |
| 2018/0187567 | A1 * | 7/2018 | Morinaka | F04D 29/10 |
| 2019/0072185 | A1 * | 3/2019 | Morinaka | F16J 15/4472 |
| 2019/0136863 | A1 * | 5/2019 | Morinaka | F04D 29/10 |
| 2019/0234416 | A1 * | 8/2019 | Morinaka | F16J 15/447 |
| 2019/0285183 | A1 * | 9/2019 | Morinaka | F16J 15/4472 |

FOREIGN PATENT DOCUMENTS

| | | |
|---|---|---|
| DE | 10 2011 052 347 A1 | 2/2012 |
| EP | 2375001 A2 | 10/2011 |
| JP | S51-082855 A | 7/1976 |
| JP | S53-104803 U | 8/1978 |
| JP | S60-098196 A | 6/1985 |
| JP | 2002-228014 A | 8/2002 |
| JP | 2011-174451 A | 9/2011 |
| JP | 2012-072736 A | 4/2012 |

OTHER PUBLICATIONS

Written Opinion issued in PCT/JP2017/021830; dated Sep. 19, 2017.

* cited by examiner

LABYRINTH SEAL

TECHNICAL FIELD

The present invention relates to a labyrinth seal.

BACKGROUND ART

A conventional labyrinth seal is disclosed, for example, in Patent Documents 1 and 2. The labyrinth seal prevents a fluid from leaking through a gap between two members (for example, a rotary body and a stationary body) constituting a rotary machine. The labyrinth seal described in Patent Document 2 includes a step portion and a plurality of fins. This configuration allows for formation of a vortex in a space between tins and generation of fluid energy loss, thereby reducing the leakage rate of the fluid.

CITATION LIST

Patent Documents

Patent Document 1: JP-A-S60-98196
Patent Document 2: JP-A-2012-72736

SUMMARY OF THE INVENTION

Technical Problems

FIG. 9 illustrates a conventional labyrinth seal. In the conventional labyrinth seal, the leakage rate of a fluid is decreased by the formation of a vortex Va and a vortex Vb in a space between fins. However, the vortex Vb has a flat shape, and the fluid energy loss caused by the vortex Vb is limited. In this respect, there is room for improvement.

Therefore, an object of the present invention to provide a labyrinth seal capable of reducing the leakage rate of a fluid.

Solution to Problems

A labyrinth seal is to be included in a rotary machine. The rotary machine includes: a first member, a second member facing the first member, and a gap formed between the first member and the second member. The gap is configured to allow a fluid to flow from a high-pressure side to a low-pressure side in a flow direction that is a direction perpendicular to a direction where the first member and the second member face each other. In a facing direction which is the direction where the first member and the second member face each other, the side of the first member relative to the second member is defined as one side of the facing direction, and in the facing direction, a side of the second member relative to the first member is defined as the other side of the facing direction. The labyrinth seal includes a step portion, a high-pressure-side fin, a low-pressure-side fin, and an annular groove. The step portion is formed in a portion of the second member on the one side of the facing direction. The high-pressure-side fin extends from a portion of the first member on the other side of the facing direction toward the other side of the facing direction, on the high-pressure side relative to the step portion. The low-pressure-side fin extends from a portion of the first member on the other side of the facing direction toward the other side of the facing direction, on the low-pressure side relative to the step portion. The annular groove is formed in a portion of the second member on the one side of the facing direction. The step portion is configured to allow a portion of the second member on the low-pressure side relative to the step portion of the second member to be arranged closer to the other side of the facing direction than a portion of the second member on the high-pressure side relative to the step portion of the second member. The annular groove is arranged in at least a part of a region on the low-pressure side relative to the step portion as well as on the high-pressure side relative to the low-pressure-side fin.

Advantageous Effects of the Invention

The configuration above enables a reduction in the leakage rate of a fluid.

DESCRIPTION OF EMBODIMENTS

First Embodiment

Figure 1:
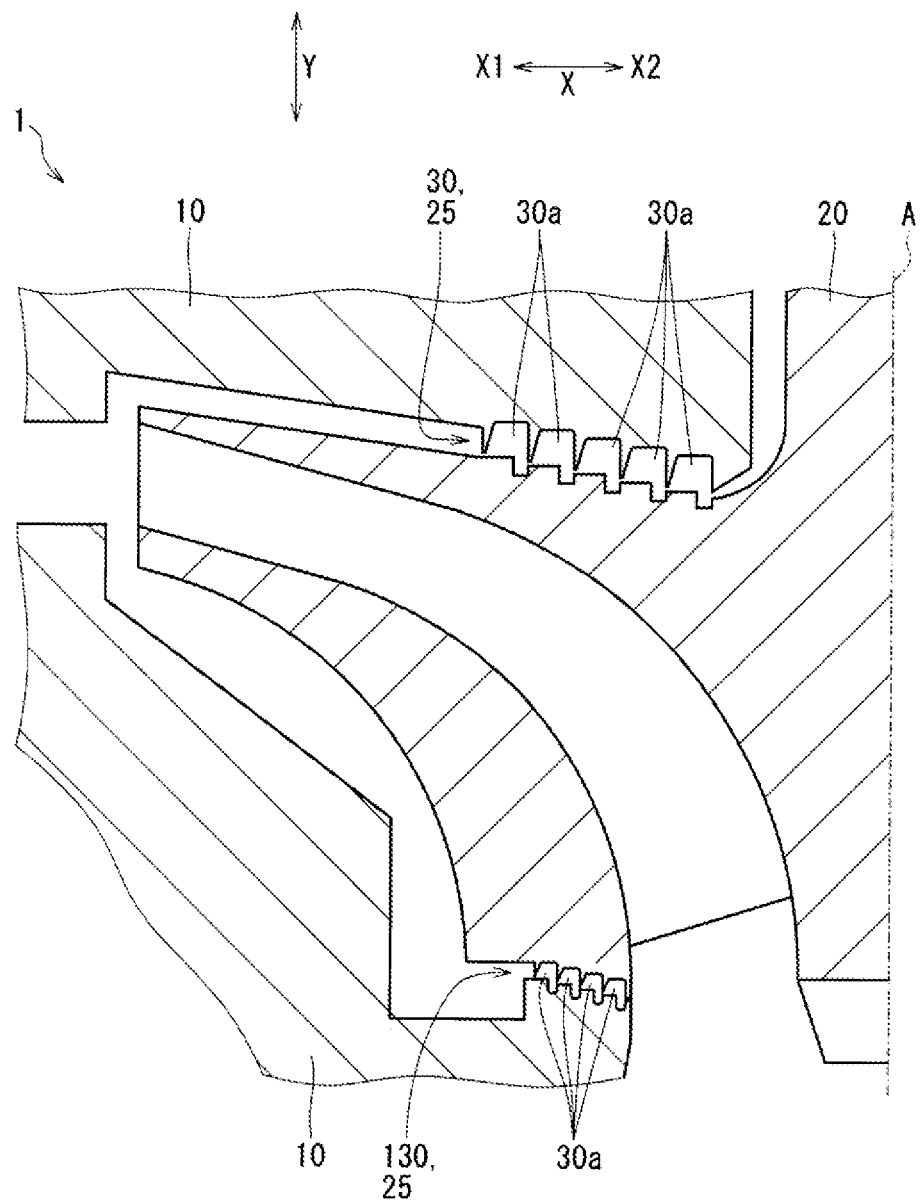
FIG. 1 is a cross-sectional view of a part of a rotary machine.
Figure 2:
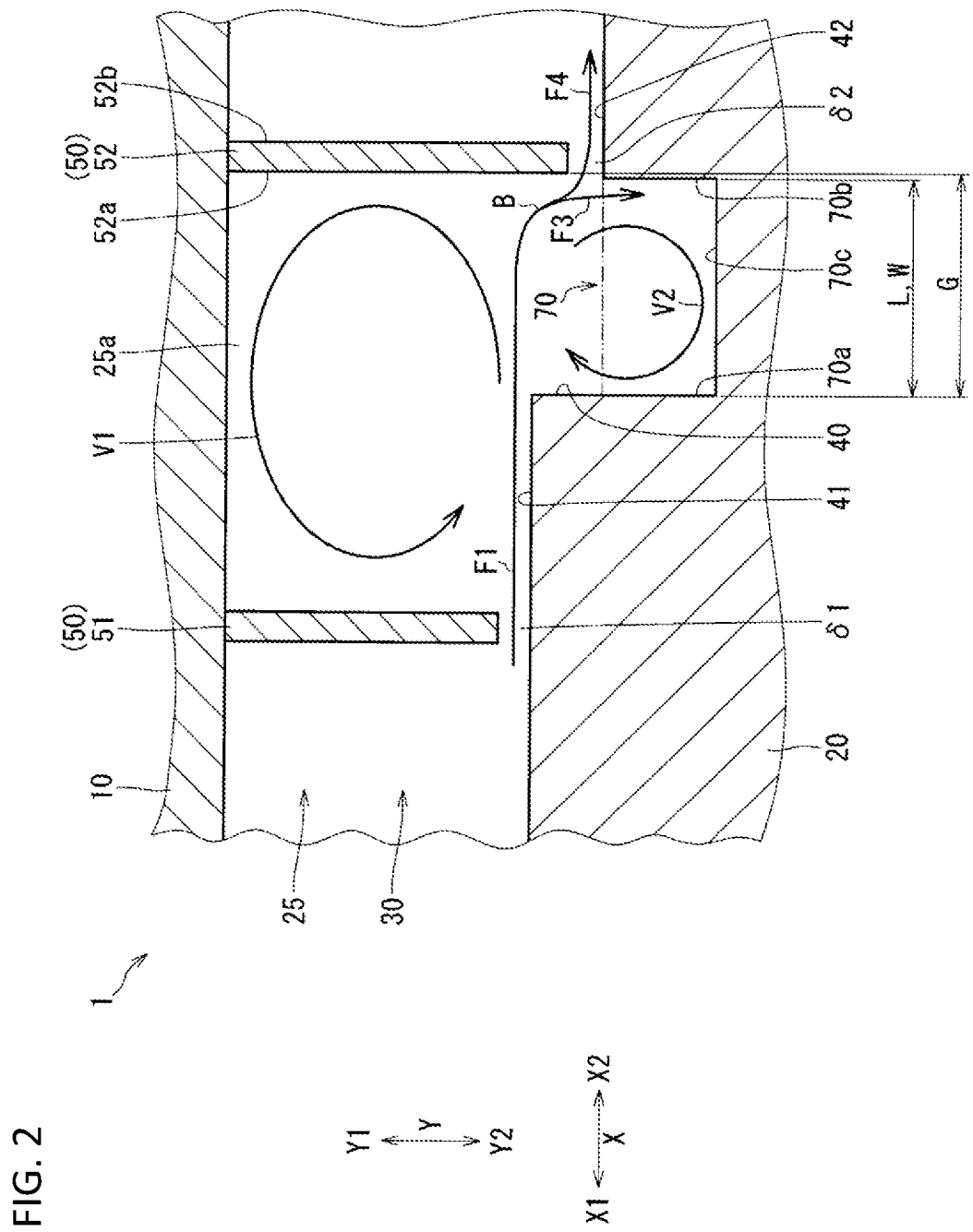
FIG. 2 is a cross-sectional view of one unit structure of the labyrinth seal in FIG.
Figure 3:
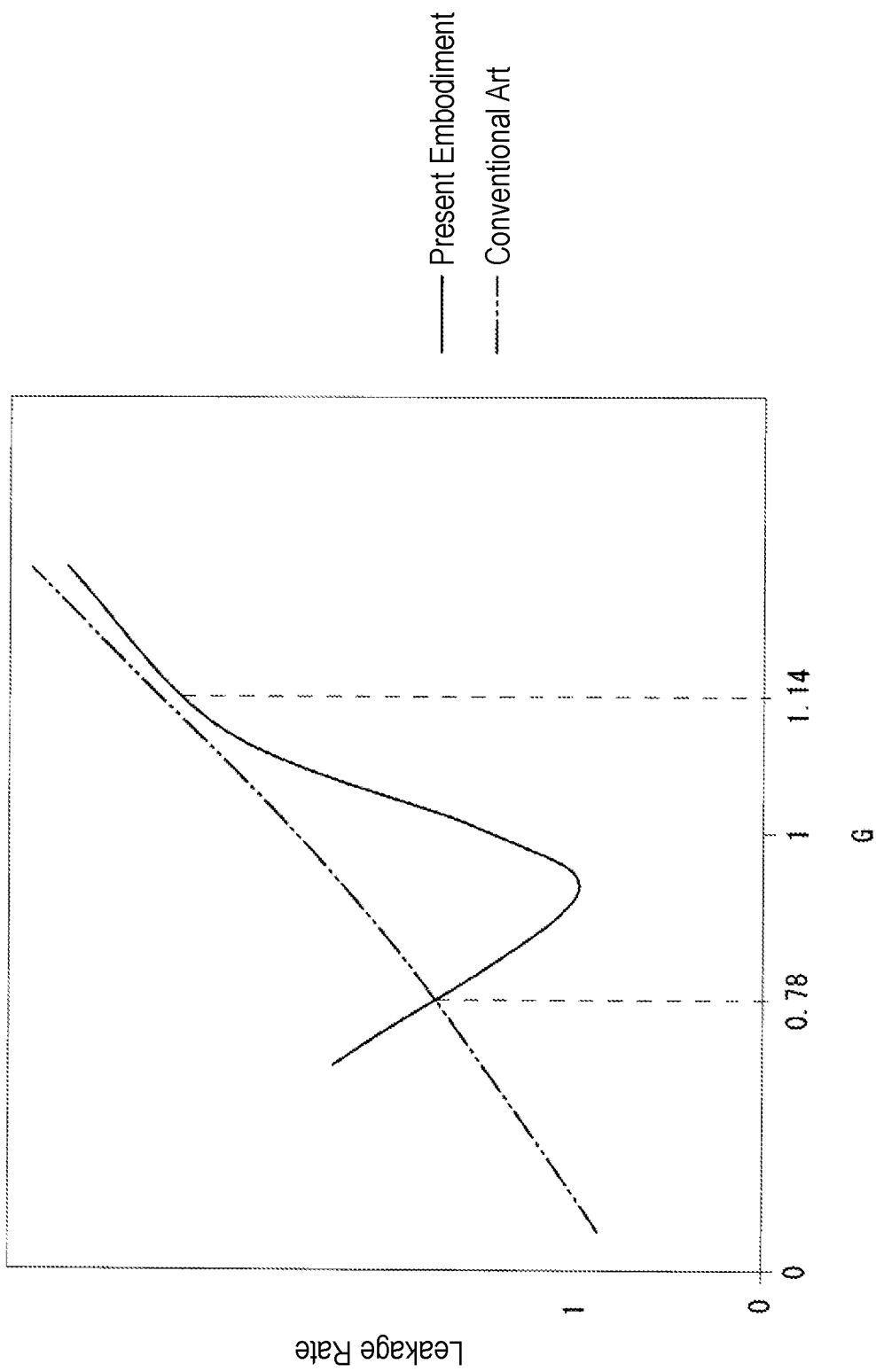
FIG. 3 is a graph illustrating the relationship between the distance G in FIG. 2 and the leakage rate.

A rotary machine 1 of the first embodiment is described by referring to FIG. 1 to FIG. 3.

The rotary machine 1 (fluid machine, fluid rotary machine) is, for example, a compressor and is, for example, a turbo compressor, or the like. The rotary machine 1 may be, for example, an expander and may be, for example, an expansion turbine, or the like. The rotary machine 1 is of centrifugal type. The rotary machine 1 includes a stationary body 10 (first member), a rotary body 20 (second member), a gap 25, a labyrinth seal 30, and a labyrinth seal 130. The stationary body 10 is, for example, a casing. The stationary body 10 may be, for example, a member arranged in a casing and fixed to the casing.

The rotary body 20 is arranged inside the stationary body 10 and rotates around a rotation axis A (central axis) relative to the stationary body 10. The rotary body 20 is, for example, an impeller. The rotary body 20 faces the stationary body 10. The portions in which the labyrinth seal 30 and the labyrinth seal 130 are provided in the rotary body 20 face the stationary body 10.

The gap 25 is, as illustrated in FIG. 2, formed between the stationary body 10 and the rotary body 20 and is formed between the portion of the stationary body 10 on the other side Y2 (described below) of the facing direction and the portion of the rotary body 20 on the one side Y1 (described below) of the facing direction. A fluid can flow through the gap 25. The gap 25 is configured to allow a fluid to flow through the gap 25 from the high-pressure side X1 in the flow direction X to the low-pressure side X2 in the flow direction X. As illustrated in FIG. 1, the flow direction X is a direction perpendicular or approximately perpendicular to the rotation axis A. In the case where the rotary machine 1 is a compressor, the high-pressure side X1 is a side away from the rotation axis A (the radially outer side based on the rotation axis A), and the low-pressure side X2 is a side closer to the rotation axis A (the radially inner side based on the rotation axis A). In the case where the rotary machine 1 is an expander, the high-pressure side X1 is a side closer to the rotation axis A, and the low-pressure side X2 is a side away from the rotation axis A. In the following, the embodiment is described by referring to a case where the rotary machine 1 is a compressor. The direction where the stationary body 10 and the rotary body 20 face each other is defined as a facing direction Y. The facing direction Y is a direction perpendicular to the flow direction X. The facing direction Y is equal (or approximately equal) to the direction of rotation axis A. As illustrated in FIG. 2, in the facing direction Y, the side of the stationary body 10 relative to the rotary body 20 is defined as one side Y1 of the facing direction, and the side of the rotary body 20 relative to the stationary body 10 is defined as the other side Y2 of the facing direction. In the gap 25, the region between a high-pressure-side fin 51 (described below) and a low-pressure-side fin 52 (described below) (the space in the flow direction X) is defined as a space 25a.

As illustrated in FIG. 1, the labyrinth seal 30 prevents the leakage of a fluid in the gap 25 from the high-pressure side X1 to the low-pressure side X2. The labyrinth seal 30 prevents circulation of the fluid within the rotary machine 1 by preventing the leakage above. The labyrinth seal 30 is an apparatus capable of reducing the leakage flow rate (hereinafter, sometimes referred to as a "leakage rate") of the fluid without contacting the stationary body 10 with the rotary body 20 (i.e. in a non-contact manner). The labyrinth seal 30 includes a plurality of unit structures 30a. The plurality of unit structures 30a are configured to be similar to one another. In the following, the embodiment is described by referring to one unit structure 30a. As illustrated in FIG. 2, the labyrinth seal 30 (each of the plurality of unit structure 30a) includes a step portion 40, a fin 50, and an annular groove 70.

The step portion 40 is formed in the portion of the rotary body 20 on the one side Y1 of the facing direction. The step portion 40 is sort of a step-down structure. Specifically, the step portion 40 is configured to allow a portion of the rotary body 20 on the low-pressure side X2 (low-pressure-side step 42) relative to the step portion 40 of the rotary body 20 to be arranged closer to the other side Y2 of the facing direction than a portion of the rotary body 20 on the high-pressure side X1 (high-pressure-side step 41) relative to the step portion 40 of the rotary body 20. The step portion 40 is connected to the low-pressure-side X2 end of the high-pressure-side step 41. The step portion 40 is connected to the high-pressure side X1 end of the low-pressure-side step 42 via the annular groove 70.

The step portion 40 has an annular shape (ring shape) centering on the rotation axis A (see FIG. 1). A cross-section of the rotary machine 1 in a plane parallel to the rotation axis A, including the rotation axis A, is referred to as "rotation axis cross-section". The rotation axis cross-section is a cross-section as viewed from a direction perpendicular to each of the facing direction Y and the flow direction X. FIG. 1 and FIG. 2 are views of the rotary machine 1 in the rotation axis cross-section. As illustrated in FIG. 2, in the rotation axis cross-section, the step portion 40 is a straight line extending in the facing direction Y. More specifically, the step portion 40 has an annular cylindrical shape centering on the rotation axis A. In the rotation axis cross-section, the step portion 40 may be a straight line inclined relative to the facing direction Y (see the step portion 540 illustrated in FIG. 7). In this case, the step portion 40 (see FIG. 7) has an annular curved surface shape centering on the rotation axis A and has a curved shape defining the outer peripheral part of a truncated cone centering on the rotation axis A. In the rotation axis cross-section, the step portion 40 may have a curved line shape (not illustrated). In this case, the step portion 40 has an annular curved shape centering on the rotation axis A. As to the above-described annular shape, the same is true for the fin 50 and the annular groove 70.

The high-pressure-side step 41 is formed in the portion of the rotary body 20 on the one side Y1 of the facing direction. In the rotation axis cross-section, the high-pressure-side step 41 is a straight line extending in the flow direction X. More specifically, the high-pressure-side step 41 has an annular planar shape centering on the rotation axis A. In the rotation axis cross-section, the high-pressure-side step 41 may have a portion (a straight line or a curved line) inclined relative to the flow direction X. In this case, the high-pressure-side step 41 has an annular curved shape (for example, a substantially planar shape) centering on the rotation axis A.

The low-pressure-side step 42 is arranged on the low-pressure side X2 relative to the high-pressure-side step 41 and arranged on the other side Y2 of the facing direction relative to the high-pressure-side step 41. The shape of the low-pressure-side step 42 is the same as the shape of the high-pressure-side step 41.

The fin 50 is a portion partitioning the gap 25 to form a space 25a. The fin 50 is arranged not to completely partition the gap 25 but to narrow the gap 25. The fin 50 extends from the portion of the stationary body 10 on the other side Y2 of the facing direction toward the other side Y2 of the facing direction and extends near to the portion of the rotary body 20 on the one side Y1 of the facing direction. The fin 50 is provided integrally with the stationary body 10. The fin 50 may be a separate body from the stationary body 10. The fin 50 includes, in the order from the high-pressure side X1 to the low-pressure side X2, a high-pressure-side fin 51 and a low-pressure-side fin 52.

The high-pressure-side fin 51 is provided on the high-pressure side X1 relative to the step portion 40. The high-pressure-side fin 51 is arranged at a position to face the high-pressure-side step 41 in the facing direction Y. A gap 51 in the facing direction Y is present between the distal end (end on the other side Y2 of the facing direction) of the high-pressure-side fin 51 and the surface (end face on the one side Y1 of the facing direction) of the high-pressure-side step 41. More specifically, the position of the distal end of the high-pressure-side fin 51 in the facing direction Y is present on the one side Y1 of the facing direction relative to the position of the surface (end face on the one side Y1 of the facing direction) of the low-pressure-side step 42 in the facing direction Y.

The low-pressure-side fin 52 is provided on the low-pressure side X2 relative to the step portion 40. The low-pressure-side fin 52 is arranged at a position to face the low-pressure-side step 42 in the facing direction Y. The low-pressure-side fin 52 may be arranged at a position to face the annular groove 70 in the facing direction Y. A gap $\delta 2$ in the facing direction Y is present between the distal end of the low-pressure-side fin 52 and the surface of the low-pressure-side step 42. The gap $\delta 2$ is an outflow port of a liquid from the space 25a. The position of the distal end of the low-pressure-side fin 52 in the facing direction Y is present on the one side Y1 of the facing direction relative to the position of the surface of the high-pressure-side step 41 in the facing direction Y. The size of the gap δ2 in the facing direction Y may be, for example, the same as or different from the size of the gap δ1 in the facing direction Y. The low-pressure-side fin 52 includes a high-pressure-side side surface 52a which is a side surface on the high-pressure side X1, and a low-pressure-side side surface 52b which is a side surface on the low-pressure side X2. The high-pressure-side side surface 52a and the low-pressure-side side surface 52b are surfaces perpendicular to the flow direction X. The "perpendicular" encompasses "substantially perpendicular" (hereinafter the same).

The annular groove 70 is a groove for allowing a vortex V2 to flow in. The annular groove 70 is configured to allow the vortex V2 to flow into the space surrounded by the annular groove 70 (the inside of the annular groove 70). The annular groove 70 is formed in the portion of the rotary body 20 on the one side Y1 of the facing direction. The annular groove 70 is dented toward the other side Y2 of the facing direction relative to the surface of the low-pressure-side step 42. The annular groove 70 is arranged in at least a part of a region on the low-pressure side X2 relative to the step portion 40 as well as on the high-pressure side X1 relative to the low-pressure-side fin 52. A part of the annular groove 70 may be arranged on the low-pressure side X2 relative to the high-pressure-side side surface 52a.

The flow-direction X position (position in the flow direction X) of the end of the annular groove 70 on the one side Y1 of the facing direction and high-pressure-side X1 end of the annular groove 70 is either the following [position a1] or [position a2]. [Position a1]: The same position as the end of step portion 40 on the other side Y2 of the facing direction and low-pressure-side X2 end of the step portion 40. [Position a2]: On the low-pressure side X2 relative to the end of the step portion 40 (not illustrated) on the other side Y2 of the facing direction and low-pressure-side X2 end of the step portion 40 (not illustrated). In the case of [position a1], the annular groove 70 is arranged on the low-pressure side X2 relative to the position of the step portion 40. In the case of [position a2], the gap in the flow direction X (low-pressure-side step 42) is formed between the end of the step portion 40 on the other side Y2 of the facing direction as well as low-pressure-side X2 end of the step portion 40 and the low-pressure-side X2 end of the annular groove 70 as well as the end of the annular groove 70 on the one side Y1 of the facing direction.

The flow-direction X position of the end of the annular groove 70 on the one side Y1 of the facing direction and low-pressure-side X2 end of the annular groove 70 is any one of the following [position b1] to [position b5]. [Position b1]: On the high-pressure side X1 relative to the distal end (end on the other side Y2 of the facing direction) of the high-pressure-side side surface 52a. [Position b2]: The same (or substantially the same) flow-direction X position as the distal end of the high-pressure-side side surface 52a. [Position b3] On the low-pressure side X2 relative to the distal end of the high-pressure-side side surface 52a as well as on the high-pressure side X1 relative to the distal end of the low-pressure-side side surface 52b. [Position b4]: The same flow-direction X position as the distal end of the low-pressure-side side surface 52b. [Position b5]: On the low-pressure side X2 relative to the low-pressure-side side surface 52b.

The annular groove 70 has an annular shape centering on the rotation axis A (see FIG. 1). In the rotation axis cross-section, the shape of the portion surrounded by the annular groove 70 (the inside of the annular groove 70) is rectangular. In FIG. 2, the end of the "portion surrounded by the annular groove 70" on the one side Y1 of the facing direction is denoted by a two-dot chain line. The annular groove 70 includes a high-pressure-side side surface 70a which is a side surface on the high-pressure side X1, a low-pressure-side side surface 70b which is a side surface on the low-pressure side X2, and a bottom surface 70c. The high-pressure-side side surface 70a and the low-pressure-side side surface 70b are surfaces perpendicular to the flow direction X. The bottom surface 70c is a surface of the portion of the annular groove 70 on the other side Y2 of the facing direction and is a surface constituting the bottom of the annular groove 70 (the bottom based on the surface of the low-pressure-side step 42). The bottom surface 70c is a surface perpendicular to the facing direction Y.

As illustrated in FIG. 1, the labyrinth seal 130 is configured to be approximately similar to the labyrinth seal 30. The difference of the labyrinth seal 130 from the labyrinth seal 30 is as follows. As illustrated in FIG. 2, in the labyrinth seal 30, the fin 50 is provided on the stationary body 10, and the step portion 40 and the annular groove 70 are provided on the rotary body 20. On the other hand, in the labyrinth seal 130 (see FIG. 1), the fin 50 is provided on the rotary body 20, and the step portion 40 and the annular groove 70 are provided on the stationary body 10.

(First Member and Second Member)

The "first member" is a member on which the fin 50 is provided. The first member is the stationary body 10 in the labyrinth seal 30 and is the rotary body 20 in the labyrinth seal 130 (see FIG. 1). The "second member" is a member on which the step portion 40 and the annular groove 70 are provided. The second member is the rotary body 20 in the labyrinth seal 30 and is the stationary body 10 in the labyrinth seal 130 (see FIG. 1).

(Flow of Fluid)

A fluid flows through the gap 25 as follows. The fluid passes through the gap 61 from the space on the high-pressure side X1 relative to the high-pressure-side fin 51 and enters the space 25a to form a main flow F1. The main flow F1 first goes straight (or substantially straight, hereinafter the same) to the low-pressure side X2 along the surface of the high-pressure-side step 41 and then goes straight to the low-pressure side X2 even after leaving the surface of the high-pressure-side step 41.

A partial flow of the main flow F1 forms a vortex V1. The vortex V1 flows as follows. A partial flow of the main flow F1 diverges from the main flow F1 toward the one side Y1 of the facing direction and flows to the one side Y1 of the facing direction approximately along the high-pressure-side side surface 52a. This flow flows to the high-pressure side X1 approximately along the surface (the end face on the other side Y2 of the facing direction) of the stationary body 10, flows to the other side Y2 of the facing direction approximately along the side surface on the low-pressure side X2 of the high-pressure-side fin 51, and joins the main flow F1.

A partial flow of the main flow F1 collides with the high-pressure-side side surface 52a and shifts to the other side Y2 of the facing direction. This flow diverges, at the branch point B, into a branch flow F3 flowing approximately along the low-pressure-side side surface 70b and a branch flow F4 flowing toward the gap δ2.

The branch flow F3 forms a vortex V2 flowing, for example, within the annular groove 70. The vortex V2 flows as follows. The branch flow F3 flows to the other side Y2 of the facing direction approximately along the low-pressure-side side surface 70b, flows to the high-pressure side X1 approximately along the bottom surface 70c, and flows to the one side Y1 of the facing direction along the high-pressure-side side surface 70a. This flow joins the main flow F1 or flows to the low-pressure side X2 in the vicinity of the main flow F1. The shape of the vortex V2 in the rotation axis cross-section is substantially circular. The vortex V2 in the rotation axis cross-section may have a flat, substantially circular (substantially elliptical) shape in which the width in the flow direction X is larger than the width in the facing direction Y, or a substantially circular shape in which the width in the facing direction Y is larger than the width in the flow direction X.

The branch flow F4 passes through the gap δ2, flows to the low-pressure side X2, and flows out (leaks) into the space on the low-pressure side X2 relative to the space 25a.

Due to flowing of the branch flow F3 into the annular groove 70, the flow rate of the branch flow F4 is decreased, and the leakage rate of a fluid from the space 25a is reduced. In addition, fluid friction is generated by the vortex V2 to cause fluid energy loss, thereby reducing the leakage rate of the fluid from the space 25a. The fluid friction encompasses friction between fluids and friction between the fluid and the wall surface. The wall surface can be regarded as a fluid at a flow velocity of zero. The wall surface includes, for example, the surface of the annular groove 70 (high-pressure-side side surface 70a, bottom surface 70c, and low-pressure-side side surface 70b).

(Dimension)

As long as the annular groove 70 is present in at least a part of a region on the low-pressure side X2 relative to the step portion 40 as well as on the high-pressure side X1 relative to the low-pressure-side fin 52, the effect (reduction in the leakage rate) based on the annular groove 70 is obtained. Furthermore, the effect based on the annular groove 70 can be more enhanced by satisfying the following conditions. The dimension regarding the flow direction X in the rotation axis cross-section includes a distance G, a distance L, and an opening width W. These dimensions are defined as follows.

The distance G is a distance (for example, the minimum distance, hereinafter the same) in the flow direction X from the step portion 40 to the distal end of the low-pressure-side fin 52 as well as high-pressure-side X1 end of the low-pressure-side fin 52. In the case where the step portion 40 has a width in the flow direction X (see, for example, the step portion 540 illustrated in FIG. 7), the starting point of the distance G on the high-pressure side X1 is the end of the step portion 40 on the other side Y2 of the facing direction as well as low-pressure-side X2 end of the step portion 40 (see FIG. 7) (the same is true for the distance L). As illustrated in FIG. 2, in this embodiment, the distance G is the distance in the flow direction X from the step portion 40 to the high-pressure-side side surface 52a.

The distance L is a distance in the flow direction X from the step portion 40 to the end of the annular groove 70 on the one side Y1 of the facing direction as well as low-pressure-side X2 end of the annular groove 70. In this embodiment, the distance L is the distance in the flow direction X from the step portion 40 to the low-pressure-side side surface 70b.

The opening width W is a width of the opening of the annular groove 70 in the flow direction X. More specifically, the opening width W is the width in the flow direction X at the end of the annular groove 70 on the one side Y1 of the facing direction. In this embodiment, the opening width W and the distance L are equal. Accordingly, with respect to the following preferable conditions regarding the distance L, the "distance L" may be interchanged with "opening width W".

The distance G and the distance L are examined by CFD (computational fluid dynamics) analysis. As a result, it was found that the leakage rate is changed by the distance G as shown in FIG. 3. Here, the leakage rate was examined by variously changing the distance G without varying the position of the annular groove 70 illustrated in FIG. 2 (without altering the distance L). In addition, the distance G when the distance G is equal to the distance L is made equal to 1, and the "Conventional Art" of FIG. 3 is a labyrinth seal not having the annular groove 70 illustrated in FIG. 2. In the conventional art, as the low-pressure-side fin 52 comes close to the step portion 40, that is, as the distance G is decreased, the leakage rate is reduced. In the graph shown in FIG. 3, the leakage rate on the vertical axis is in dimensionless unit. Here, as to this embodiment, since the distance G when the distance G is equal to the distance L is made equal to 1, the relationship between the distance G and the leakage rate shown in FIG. 3 is equal to the relationship between G/L and the leakage rate. Accordingly, in this embodiment, G on the horizontal axis of the graph shown in FIG. 3 may be interchanged with G/L.

When the distance L illustrated in FIG. 2 is too smaller than the distance G, that is, when the low-pressure-side side surface 70b of the annular groove 70 is away too much toward the high-pressure side X1 relative to the high-pressure-side side surface 52a of the fin 50, there arises the following problem. In this case, the fluid at the branch point B, more specifically, the fluid shifted to the other side Y2 of the facing direction from the low-pressure side X2 by the low-pressure-side fin 52, can hardly flow into the annular groove 70. Consequently, the flow rate of the branch flow F4 increases, and the effect of reducing the leakage rate decreases. In addition, when the distance L is too larger than the distance G, that is, when the low-pressure-side side surface 70b is away too much toward the low-pressure side X2 relative to the high-pressure-side side surface 52a, there arises the following problem. In this case, the gap δ2 between the distal end of the low-pressure-side fin 52 and the low-pressure-side step 42 becomes large, facilitating fluid passing through the gap δ2, and the effect of reducing the leakage rate decreases.

For this reason, it is preferable to satisfy the relationship "0.78<G<L" as shown in FIG. 3. In this case, the leakage rate can be unfailingly reduced, as compared with the conventional art. Furthermore, G/L is more preferably from about 0.8 to 1 (0.8 or more and 1 or less). It is still more preferable to set the position of the low-pressure-side side surface 70b in the flow direction X and the position of the high-pressure-side side surface 52a in the flow direction X at substantially the same position. When G/L is from about 0.8 to 1, the effect of reducing the leakage rate can be increased, as compared with the case where G/L is less than 0.8 or exceeds 1. G/L may be set so as to satisfy the relationship "G/L<1.14". The analysis above was performed for the case where the rotation axis A (see FIG. 1) side is the low-pressure side X2 and the side away from the rotation axis A is the high-pressure side X1 (in the case where the rotary machine 1 is a compressor). In this connection, also in the case where the rotation axis A side is the high-pressure side X1 and the side away from the rotation axis A is the low-pressure side X2 (in the case where the rotary machine 1 is an expander), the same results would be obtained as long as the labyrinth seal 30 has the same structure.

(Effect 1)

The effect based on the labyrinth seal 30 illustrated in FIG. 2 is as follows. The labyrinth seal 30 is provided in a rotary machine 1. The rotary machine 1 includes a stationary body 10, a rotary body 20 facing the stationary body 10, and a gap 25. The gap 25 is formed between the stationary body 10 and the rotary body 20 and is configured to allow a fluid to flow from the high-pressure side X1 to the low-pressure side X2 in the flow direction X. The flow direction X is a direction perpendicular to the direction where the stationary body 10 and the rotary body 20 face each other. In the facing direction Y which is the direction where the stationary body 10 and the rotary body 20 face each other, the side of the stationary body 10 relative to the rotary body 20 is defined as one side Y1 of the facing direction, and the side of the rotary body 20 relative to the stationary body 10 is defined as the other side Y2 of the facing direction. The labyrinth seal 30 includes a step portion 40, a high-pressure-side fin 51, a low-pressure-side fin 52, and an annular groove 70. The step portion 40 is formed in a portion of the rotary body 20 on the one side Y1 of the facing direction. The high-pressure-side fin 51 extends toward the other side Y2 of the facing direction from a portion of the stationary body 10 on the other side Y2 of the facing direction on the high-pressure side X1 relative to the step portion 40.

[Configuration 1-1]

The low-pressure-side fin 52 extends toward the other side Y2 of the facing direction from a portion of the stationary body 10 on the other side Y2 of the facing direction on the low-pressure side X2 relative to the step portion 40.

[Configuration 1-2]

The annular groove 70 is formed in a portion of the rotary body 20 on the one side Y1 of the facing direction.

[Configuration 1-3]

The step portion 40 is configured to allow a portion of the rotary body 20 on the low-pressure side X2 (low-pressure-side step 42) relative to the step portion 40 of the rotary body 20 to be arranged closer to the other side Y2 of the facing direction than a portion of the rotary body 20 on the high-pressure side X1 (high-pressure-side step 41) relative to the step portion 40 of the rotary body 20.

[Configuration 1-4]

The annular groove 70 is arranged in at least a part of a region on the low-pressure side X2 relative to the step portion 40 as well as on the high-pressure side X1 relative to the low-pressure-side fin 52.

Figure 9:
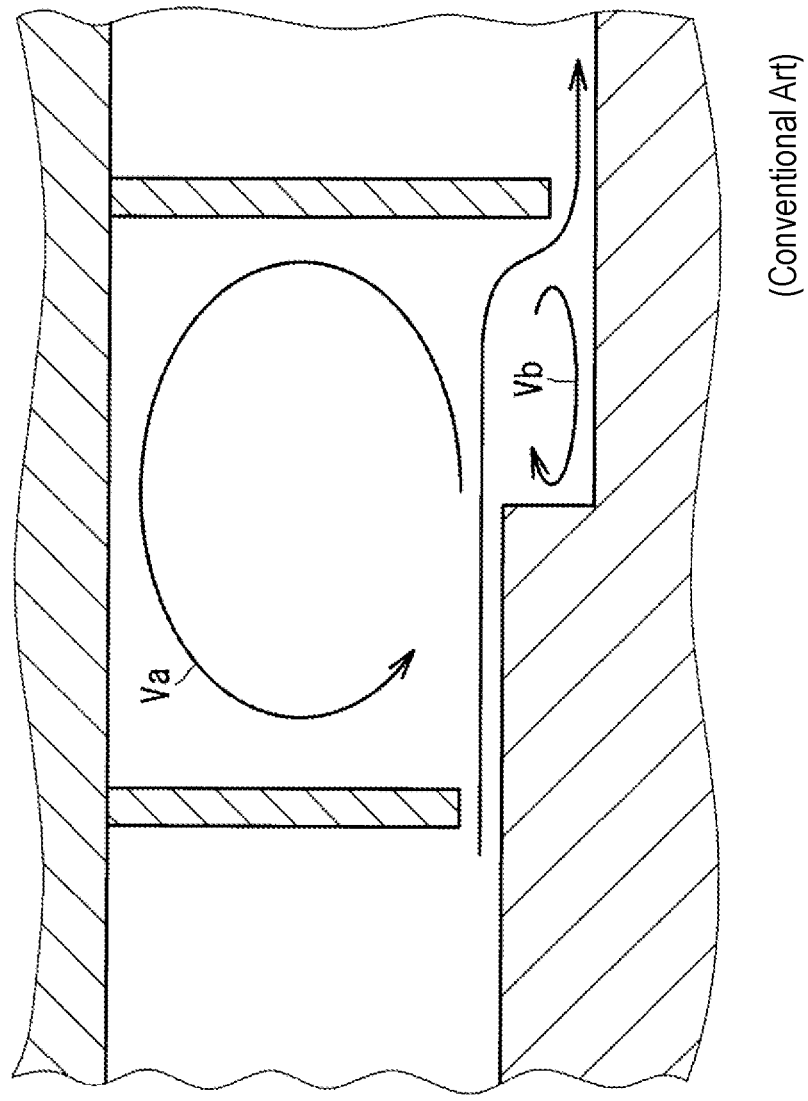
FIG. 9 is a cross-sectional view of a conventional labyrinth seal.

The labyrinth seal 30 mainly includes the low-pressure-side fin 52 of [configuration 1-1] and the step portion 40 of [configuration 1-3]. The vortex V2 is therefore formed on the low-pressure side X2 relative to the step portion 40 as well as on the high-pressure side X1 relative to the low-pressure-side fin 52. In this connection, the labyrinth seal 30 includes the annular groove 70 of [configuration 1-2] and [configuration 1-4]. Accordingly, the vortex V2 flows into the annular groove 70. Consequently, as compared with the case of having no annular groove 70 (see FIG. 9), the vortex V2 can be expanded, the flow rate of the vortex V2 can be increased, and the flow velocity of the vortex V2 can be raised. The fluid friction between the vortex V2 and its periphery can be increased, making it possible to increase the fluid energy loss. As a result, the leakage of the fluid in the gap 25 can be prevented.

The labyrinth seal 30 mainly includes [configuration 1-1] and [configuration 1-3]. The main flow F1 diverges, at the branch point B, into a branch flow F3 and a branch flow F4. Here, in the case of not providing the annular groove 70, the flow flowing to the other side Y2 of the facing direction at the branch point B comes into contact with the low-pressure-side step 42 and readily moves on to the gap δ2 (readily becomes the branch flow F4). To cope with this, the labyrinth seal 30 includes the annular groove 70 of [configuration 1-2] and [configuration 1-4]. Therefore, the flow flowing to the other side Y2 of the facing direction at the branch point B is likely to flow into the annular groove 70 (the amount of the branch flow F3 is likely to be increased). Accordingly, the amount of the flow (branch flow F4) moving on to the gap 62 from the branch point B can be reduced, so that leakage of the fluid in the gap 25 can be prevented.

(Effect 2)

[Configuration 2]

The annular groove 70 is formed on the low-pressure side X2 relative to the position of the step portion 40.

In [configuration 2], the annular groove 70 is widely formed to extend toward the high-pressure side X1 to the limit. Accordingly, the volume of the annular groove 70 can be increased, and thus, the vortex V2 can be expanded. Consequently, the fluid energy loss in the vortex V2 can be more increased, and leakage of the fluid in the gap 25 can be more prevented.

(Effect 3)

The distance in the flow direction X from the step portion 40 to the end of the annular groove 70 on the one side Y1 of the facing direction as well as low-pressure-side X2 end of the annular groove 70 is denoted by L. The distance in the flow direction X from the step portion 40 to the distal end of the low-pressure-side fin 52 as well as high-pressure-side X1 end of the low-pressure-side fin 52 is denoted by G.

[Configuration 3]

In this case, the relationship "$0.78 < G/L$" is satisfied.

According to [configuration 3], the flow rate of the vortex V2 flowing into the annular groove 70 can be increased, as compared with the case of "$0.78 \geq G/L$". Consequently, the fluid energy loss in the vortex V2 can be more increased, and therefore, leakage of the fluid in the gap 25 can be more prevented (see FIG. 3).

Second Embodiment

Figure 4:
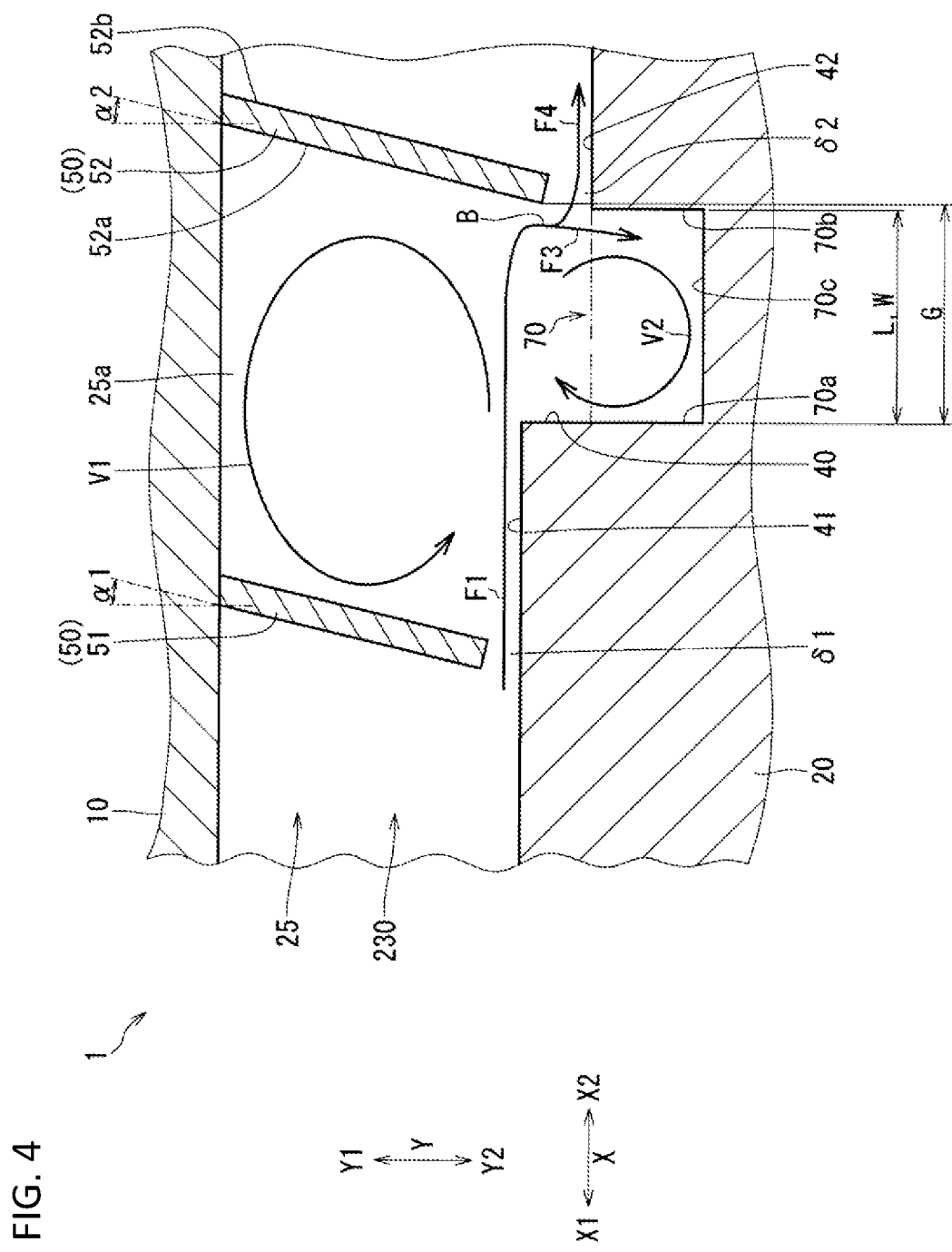
FIG. 4 shows a second embodiment and corresponds to FIG. 2.

With respect to the labyrinth seal 230 of the second embodiment, the difference from the first embodiment is described by referring to FIG. 4. As to the labyrinth seal 230, the same reference numerals as in the first embodiment are used for the parts in common with the first embodiment, and description of the parts is omitted (the same holds true for the description of other embodiments in terms of omitting the description of parts in common). The difference is the inclination of the 50 relative to the facing direction Y.

The distal end of the low-pressure-side fin 52 is arranged on the high-pressure side X1 relative to the proximal end (end on the one side Y1 of the facing direction) of the low-pressure-side fin 52. The low-pressure-side X2 end of the distal end of the low-pressure-side fin 52 is arranged on the high-pressure side X1 relative to the high-pressure-side X1 end of the proximal end of the low-pressure-side fin 52. In the rotation axis cross-section, the low-pressure-side fin 52 is a straight line, the high-pressure-side side surface 52a is a straight line, and the low-pressure-side side surface 52b is a straight line. In the rotation axis cross-section, the high-pressure-side side surface 52a is inclined at an angle α2 relative to the facing direction Y. In the rotation axis cross-section, the low-pressure-side fin 52 may have a curved shape or a bent shape such as L shape (the same holds true for the high-pressure-side fin 51). In addition, the low-pressure-side side surface 52b may be inclined (for example, at an angle α2) relative to the facing direction Y or may not be inclined relative to the facing direction Y.

The high-pressure-side fin 51 is configured to be similar to the low-pressure-side fin 52. In the rotation axis cross-section, the side surface on the high-pressure side X1 of the high-pressure-side fin 51 is inclined at an angle α1 relative to the facing direction Y. The angle α1 may be the same as or different from the angle α2. Furthermore, either the angle α1 or the angle α2 may be 0°. In the following, the case where the angle α2 is larger than 0° is described.

(Effect 4)

The effect based on the labyrinth seal 230 illustrated in FIG. 4 is as follows.

[Configuration 4]

The distal end of the low-pressure-side fin 52 is arranged on the high-pressure side X1 relative to the proximal end of the low-pressure-side fin 52.

According to [configuration 4], the fluid (fluid at the branch point B) shifted to the other side Y2 of the facing direction from the low-pressure side X2 by the low-pressure-side fin 52 is likely to flow to the high-pressure side X1 while flowing to the other side Y2 of the facing direction. Accordingly, the amount of the branch flow F4 moving on to the low-pressure side X2 can be reduced, and the amount of the branch flow F3 (vortex V2) flowing into the annular groove 70 can be increased. Furthermore, the main flow F1 flowing on the low-pressure side X2 toward the low-pressure-side fin 52 comes into contact with the low-pressure-side fin 52 and readily flows to the one side Y1 of the facing direction (the vortex V1 is likely to be formed) but is less likely to flow to the other side Y2 of the facing direction. Consequently, the amounts of the branch flow F3 and the branch flow F4 can be reduced. As a result, leakage of the fluid in the gap 25 can be further prevented.

Third Embodiment

Figure 5:
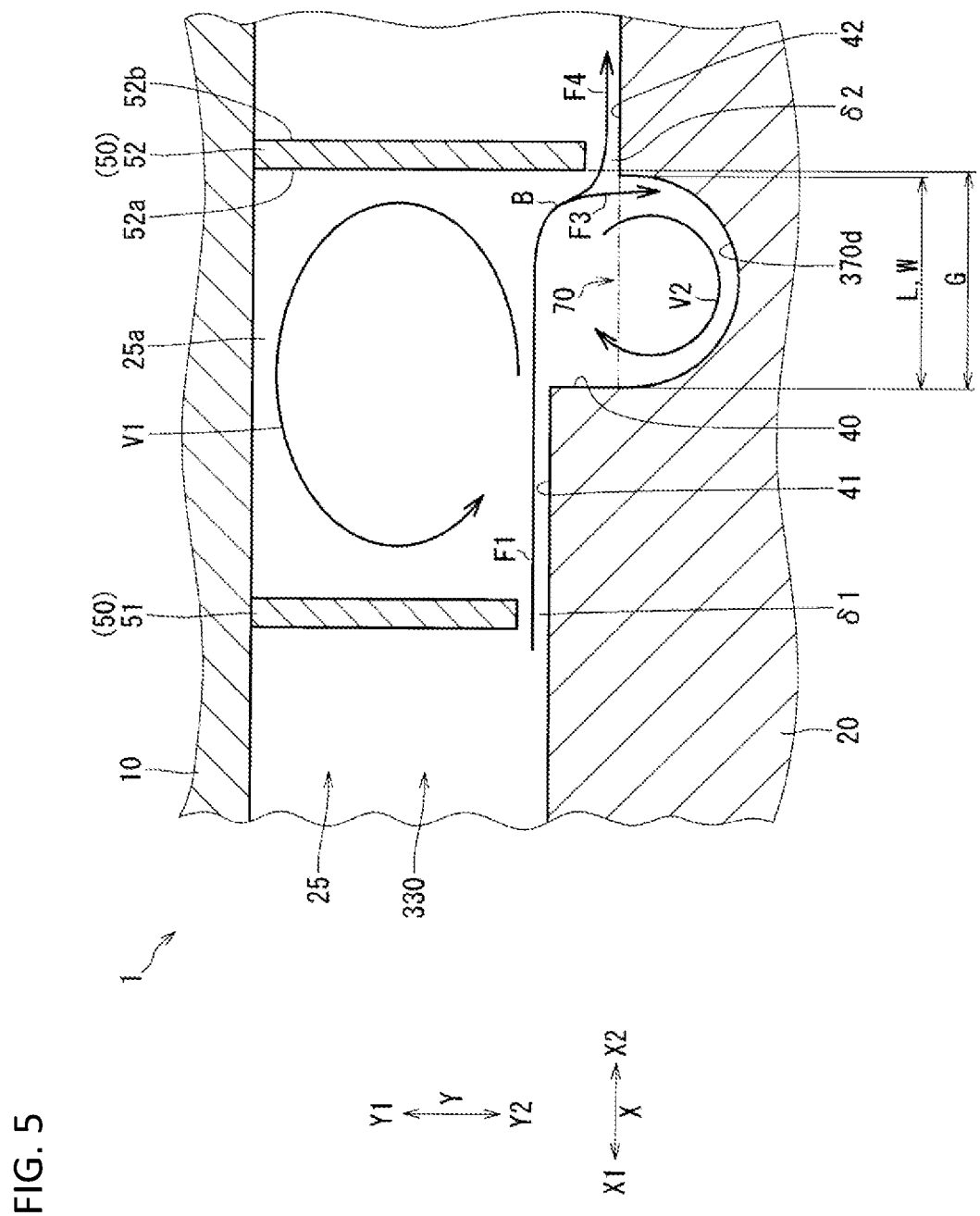
FIG. 5 shows a third embodiment and corresponds to FIG. 2.

With respect to the labyrinth seal 330 of the third embodiment, the difference from the first embodiment is described by referring to FIG. 5. The difference is that the annular groove 70 has an arc-shaped portion 370d.

The arc-shaped portion 370d is provided at the bottom of the annular groove 70. The arc-shaped portion 370d in the rotation axis cross-section has an arc-shaped cross-section protruding toward the other side Y2 of the facing direction. The cross-section of the arc-shaped portion 370d in the rotation axis cross-section has a circular arc shape and has a semi-circular arc shape (the central angle of the circular arc is 180°). The central angle of the circular arc may be less than 180°. The "circular arc shape" encompasses a substantially circular arc shape (for example, substantially semi-circular arc shape). The cross-section of the arc-shaped portion 370d in the rotation axis cross-section may have an elliptical arc shape (a curved shape constituting a part of an ellipse) or may have a semi-elliptical arc shape. The "elliptical arc shape" encompasses a substantially elliptical arc shape (for example, a substantially semi-elliptical circular arc shape). The high-pressure-side side surface 70a (see FIG. 2) and the low-pressure-side side surface 70b (see FIG. 2) are provided to be continuous with the arc-shaped portion 370d. In the case of providing the arc-shaped portion 370d, the high-pressure-side side surface 70a and the low-pressure-side side surface 70b may not be provided.

(Effect 5)

The effect based on the labyrinth seal 330 illustrated in FIG. 5 is as follows.

[Configuration 5]

The cross-section of the bottom of the annular groove 70 as viewed from a direction perpendicular to each of the facing direction Y and the flow direction X (the cross-section in the rotation axis cross-section) has an arc shape protruding toward the other side Y2 of the facing direction.

According to [configuration 5], as compared with the case where the inside of the annular groove 70 has a rectangular shape in the rotation axis cross-section (see FIG. 2), the shape of the annular groove 70 becomes a shape close to the shape of the vortex V2 flow. Therefore, the vortex V2 flows along the bottom of the annular groove 70, and thus, the vortex V2 can be prevented from reduction in the flow velocity in the annular groove 70. Consequently, the energy loss in the vortex V2 can be more increased, and leakage of the fluid in the gap 25 can be more prevented.

Fourth Embodiment

Figure 6:
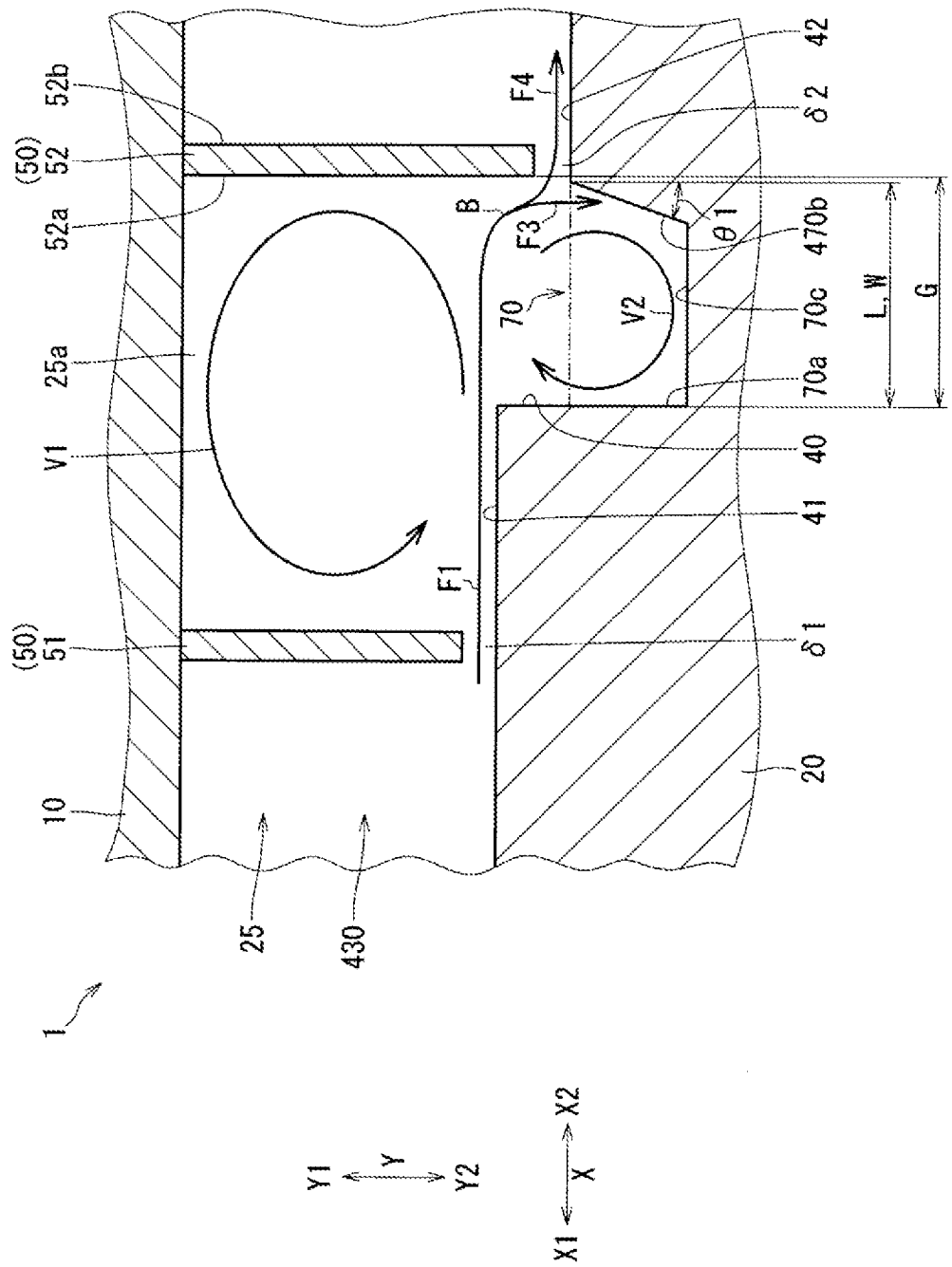
FIG. 6 shows a fourth embodiment and corresponds to FIG. 2.

With respect to the labyrinth seal 430 of the fourth embodiment, the difference from the first embodiment is described by referring to FIG. 6. The difference is the shape of the annular groove 70. The annular groove 70 has a low-pressure-side slant portion 470b (slant portion).

The low-pressure-side slant portion 470b is provided in the low-pressure-side X2 portion of the annular groove 70. The end of the low-pressure-side slant portion 470b on the other side Y2 of the facing direction is arranged on the high-pressure side X1 (the center side of the annular groove 70 in the flow direction X) relative to the end of the low-pressure-side slant portion 470b on the one side Y1 of the facing direction. In the rotation axis cross-section, the low-pressure-side slant portion 470b is a straight line and is inclined at an angle θ1 relative to the facing direction Y. In the rotation axis cross-section, the low-pressure-side slant portion 470b may not be a straight line but may be a curved line.

(Effect 6a)

The effect based on the labyrinth 430 illustrated in FIG. 6 is as follows.

[Configuration 6a]

The annular groove 70 has a low-pressure-side slant portion 470b provided in the low-pressure-side X2 portion of the annular groove 70. The end of the low-pressure-side slant portion 470b on the other side Y2 of the facing direction is arranged on the center side (high-pressure side X1) of the annular groove 70 in the flow direction X relative to the end of the low-pressure-side slant portion 470b on the one side Y1 of the facing direction.

According to [configuration 6a], as compared with the case where the inside of the annular groove 70 has a rectangular shape in the rotation axis cross-section (see FIG. 2), the shape of the annular groove 70 becomes a shape close to the flow shape of the vortex V2. Therefore, the vortex V2 flows along the low-pressure-side slant portion 470b, and thus, the vortex V2 can be prevented from reduction in the flow velocity in the annular groove 70. Consequently, the energy loss in the vortex V2 can be more increased, and leakage of the fluid in the gap 25 can be more prevented.

Fifth Embodiment

Figure 7:
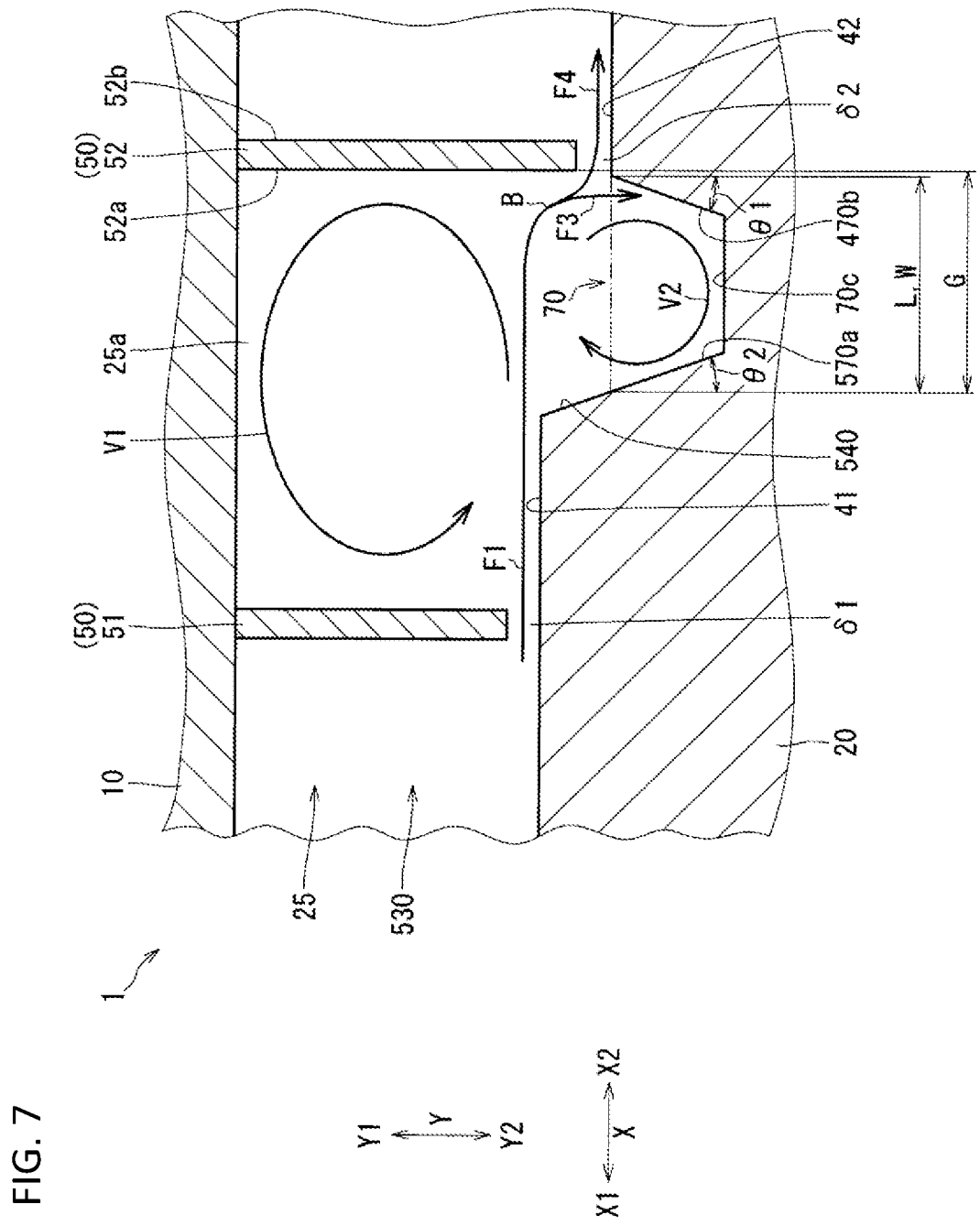
FIG. 7 shows a fifth embodiment and corresponds to FIG. 2.

With respect to the labyrinth seal 530 of the fifth embodiment, the difference from the fourth embodiment is described by referring to FIG. 7. The difference is the shapes of the step portion 540 and the annular groove 70. The annular groove 70 has a high-pressure-side slant portion 570a (slant portion).

The high-pressure-side slant portion 570a is provided in the high-pressure-side X1 portion of the annular groove 70. The end of the high-pressure-side slant portion 570a on the other side Y2 of the facing direction is arranged on the low-pressure side X2 (the center side of the annular groove 70 in the flow-direction X) relative to the end of the high-pressure-side slant portion 570a on the one side Y1 of the facing direction. In the rotation axis cross-section, the high-pressure-side slant portion 570a is a straight line and is inclined at an angle θ2 relative to the facing direction Y. The angle θ2 may be the same as or different from the angle θ1. In addition, in the rotation axis cross-section, the high-pressure-side slant portion 570a may not be a straight line but may be a curved line. Furthermore, only either one of the high-pressure-side slant portion 570a or the low-pressure-side slant portion 470b may be provided (either the angle θ1 or the angle θ2 may be 0°).

The step portion 540 is inclined at an angle θ2 relative to the facing direction Y, similarly to the high-pressure-side slant portion 570a. In the rotation axis cross-section, the step portion 540 and the high-pressure-side slant portion 570a are linearly continued.

(Effect 6b)

The effect based on the labyrinth seal 530 illustrated in FIG. 7 is as follows.

[Configuration 6b]

The annular groove 70 has a high-pressure-side slant portion 570a provided in the high-pressure-side X1 portion of the annular groove 70. The end of the high-pressure-side slant portion 570a on the other side Y2 of the facing direction is arranged on the center side (low-pressure side X2) of the annular groove 70 in the flow direction X relative to the end of the high-pressure-side slant portion 570a on the one side Y1 of the facing direction.

According to [configuration 6b], the same effect as "(Effect 6a)" is obtained (however, the low-pressure-side slant portion 470b is interchanged with the high-pressure-side slant portion 570a).

Sixth Embodiment

Figure 8:
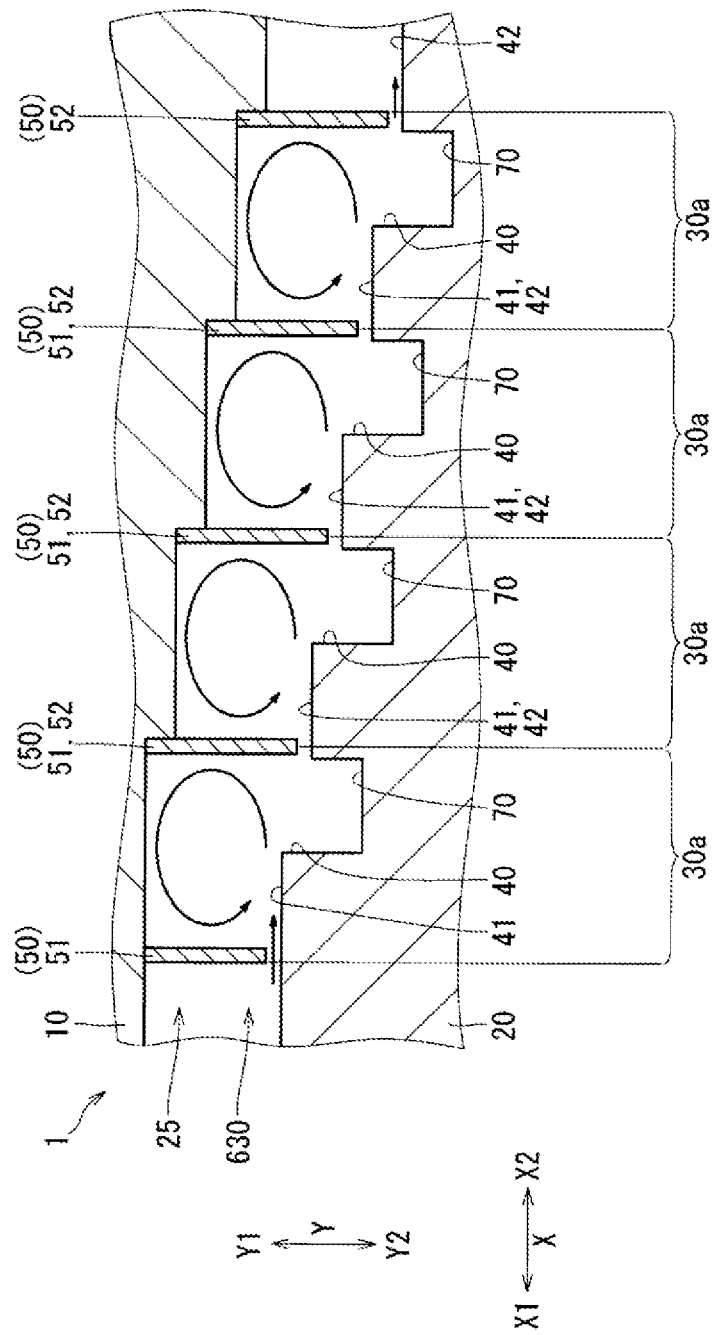
FIG. 8 shows a sixth embodiment and corresponds to FIG. 2.

The labyrinth seal 630 of the sixth embodiment is described by referring to FIG. 8. The difference from the first embodiment is mainly described. The labyrinth seal 630 includes a plurality of unit structures 30a, similarly to the first embodiment. The plurality of unit structures 30a are adjacent to each other in the flow direction X and are arranged continuously (side by side) in the flow direction X. In two adjacent unit structures 30a, the low-pressure-side step 42 of the unit structure 30a on the high-pressure side X1 serves also as the high-pressure-side step 41 of the unit structure 30a on the low-pressure side X2. The high-pressure-side steps 41, step portions 40 and low-pressure-side steps 42 in the plurality of unit structures 30a are arranged on the other side Y2 of the facing direction gradually from the high-pressure side X1 to the low-pressure side X2 to constitute a step structure.

In adjacent two unit structures 30a, the low-pressure-side fin 52 of the unit structure 30a on the high-pressure side X1 serves also as the high-pressure-side fin 51 of the unit structure 30a on the low-pressure side X2. The number of unit structures 30a may be 4 as in the labyrinth seals 130 of FIG. 8 and FIG. 1, may be 5 as in the labyrinth seal 30 of FIG. 1, may be 3 or less, or may be 6 or more. Each unit structure 30a may be deformed as in any of the second to fifth embodiments.

The effect based on the labyrinth seal 630 illustrated in FIG. 8 is as follows.

[Configuration 6]

The labyrinth seal 630 includes a plurality of unit structures 30a adjacent to one another in the flow direction X. Each of the plurality of unit structures 30a includes a step portion 40, a high pressure-side fin 51, a low-pressure-side fin 52, and an annular groove 70.

According to [configuration 6], leakage of the fluid in the gap 25 can be more prevented, as compared with the case where only one unit structure 30a is provided.

(Modifications)

Each of the embodiments above may be variously modified. A part of the constituent elements of the embodiment(s) above may not be provided. The number of constituent elements of the embodiment(s) above may be changed. Constituent elements of the embodiment(s) different from each other may be combined. For example, at least either the high pressure-side slant portion 570a or the low-pressure-side slant portion 470b illustrated in FIG. 7 may be added to the annular groove 70 having an arc-shaped portion 370d illustrated in FIG. 5. Furthermore, when the high pressure-side side surface 70a conforms to the facing direction Y as illustrated in FIG. 2, the step portion 540 may be inclined relative to the facing direction Y as illustrated in FIG. 7. In the case where a high pressure-side slant portion 570a inclined relative to the facing direction Y as illustrated in FIG. 7 is provided, the slope of inclination of the step portion 40 relative to the facing direction Y may be different from the angle θ2, or the step portion 40 may conform to the facing direction Y as illustrated in FIG. 2.

The angle α2 of the high pressure-side side surface 52a relative to the facing direction Y and the angle of the low-pressure-side side surface 52b relative to the facing direction Y, illustrated in FIG. 4, may be different. For example, in the case where the high pressure-side side surface 52a extends in the facing direction Y as illustrated in FIG. 2, the low-pressure-side side surface 52b may be inclined relative to the facing direction Y as illustrated in FIG. 4 (see FIG. 1).

The facing direction Y and the flow direction X may be a direction inclined relative to the rotation axis A. The facing direction Y may be perpendicular to the rotation axis A. The flow direction X may be parallel to the rotation axis A.

This application is based on Japanese Patent Application No. 2016-123329 filed on Jun. 22, 2016, the contents of which are incorporated herein by reference.

DESCRIPTION OF REFERENCE NUMERALS AND SIGNS

1: Rotary machine
10: Stationary body (first member or second member)
20: Rotary body (second member or first member)
25: Gap
30, 130, 230, 330, 430, 530, 630: Labyrinth seal
30a: Unit structure
40, 540: Step portion
51: High-pressure-side fin
52: Low-pressure-side fin
70: Annular groove
370d: Arc-shaped portion
470b: Low-pressure-side slant portion (slant portion)
570a: High-pressure-side slant portion (slant portion)

X: Flow direction
X1: High-pressure side
X2: Low-pressure side
Y: Facing direction
Y1: One side of facing direction
Y2: Other side of facing direction

The invention claimed is:

1. A labyrinth seal to be included in a rotary machine, such that when the seal is included in the rotary machine,
a gap is formed between a first member of the rotary machine and a second member of the rotary machine facing the first member, the gap being configured to allow a fluid to flow from a high-pressure side to a low-pressure side in a flow direction that is a direction perpendicular to a direction where the first member and the second member face each other, and in a facing direction which is the direction where the first member and the second member face each other, the side of the first member relative to the second member is defined as one side of the facing direction, and in the facing direction, a side of the second member relative to the first member is defined as the other side of the facing direction,
the labyrinth seal comprising:
a step portion formed in a portion of the second member on the other side of the facing direction,
a high-pressure-side fin extending from a portion of the first member on the one side of the facing direction toward the other side of the facing direction, on the high-pressure side relative to the step portion,
a low-pressure-side fin extending from a portion of the first member on the one side of the facing direction toward the other side of the facing direction, on the low-pressure side relative to the step portion, and
an annular groove formed in a portion of the second member on the other side of the facing direction, wherein
the step portion is configured such that a low-pressure-side step portion of the second member on the low-pressure side relative to the step portion and the annular groove, is farther away from the first member in the facing direction than a portion of the second member on the high-pressure side relative to the step portion of the second member,
the portion of the second member on the high-pressure side relative to the step portion is immediately adjacent to the step portion,
the annular groove and the low-pressure-side step are immediately adjacent to each other, and
the annular groove is arranged in at least a part of a region on the low-pressure side relative to the step portion as well as on the high-pressure side relative to the low-pressure-side fin.

2. The labyrinth seal according to claim 1, wherein the annular groove is formed on the low-pressure side relative to the position of the step portion.

3. The labyrinth seal according to claim 1, wherein the following relationship is satisfied:

$0.78 < G/L,$ wherein L is a distance in the flow direction from the step portion to a portion which is an end of the annular groove on the one side of the facing direction and a low-pressure-side end of the annular groove, and
G is a distance in the flow direction from the step portion to a portion which is a distal end of the low-pressure-side fin and the high-pressure-side end of the low-pressure-side fin.

4. The labyrinth seal according to claim 2, wherein the following relationship is satisfied:

$0.78 < G/L,$ wherein L is a distance in the flow direction from the step portion to a portion which is an end of the annular groove on the one side of the facing direction and a low-pressure-side end of the annular groove, and
G is a distance in the flow direction from the step portion to a portion which is a distal end of the low-pressure-side fin and the high-pressure-side end of the low-pressure-side fin.

5. The labyrinth seal according to claim 1, wherein a distal end of the low-pressure-side fin is arranged on the high-pressure side relative to a proximal end of the low-pressure-side fin.

6. The labyrinth seal according to claim 1, wherein a cross-section of a bottom of the annular groove as viewed from a direction perpendicular to each of the facing direction and the flow direction has an arc shape protruding toward the one side of the facing direction.

7. The labyrinth seal according to claim 1, wherein:
the annular groove has a slant portion formed in at least one of a high-pressure-side portion and a low-pressure-side portion in the annular groove; and
the annular groove has a width in the flow direction at an end of the slant portion on the other side of the facing direction smaller than a width in the flow direction at an end of the slant portion on the one side of the facing direction.

8. The labyrinth seal according to claim 1, wherein:
the labyrinth seal comprises a plurality of unit structures adjacent to one another in the flow direction; and
each of the plurality of unit structures comprises an additional one of the step portion, an additional one of the high-pressure-side fin, an additional one of the low-pressure-side fin, and an additional one of the annular groove.

9. The labyrinth seal according to claim 2, wherein a distal end of the low-pressure-side fin is arranged on the high-pressure side relative to a proximal end of the low-pressure-side fin.

10. The labyrinth seal according to claim 3, wherein a distal end of the low-pressure-side fin is arranged on the high-pressure side relative to a proximal end of the low-pressure-side fin.

11. The labyrinth seal according to claim 4, wherein a distal end of the low-pressure-side fin is arranged on the high-pressure side relative to a proximal end of the low-pressure-side fin.

12. The labyrinth seal according to claim 2, wherein a cross-section of a bottom of the annular groove as viewed from a direction perpendicular to each of the facing direction and the flow direction has an arc shape protruding toward the one side of the facing direction.

13. The labyrinth seal according to claim 3, wherein a cross-section of a bottom of the annular groove as viewed from a direction perpendicular to each of the facing direction and the flow direction has an arc shape protruding toward the one side of the facing direction.

14. The labyrinth seal according to claim 4, wherein a cross-section of a bottom of the annular groove as viewed from a direction perpendicular to each of the facing direction and the flow direction has an arc shape protruding toward the one side of the facing direction.

15. The labyrinth seal according to claim 2, wherein:
the annular groove has a slant portion formed in at least one of a high-pressure-side portion and a low-pressure-side portion in the annular groove; and
the annular groove has a width in the flow direction at an end of the slant portion on the other side of the facing direction smaller than a width in the flow direction at an end of the slant portion on the one side of the facing direction.

16. The labyrinth seal according to claim 3, wherein:
the annular groove has a slant portion formed in at least one of a high-pressure-side portion and a low-pressure-side portion in the annular groove; and
the annular groove has a width in the flow direction at an end of the slant portion on the other side of the facing direction smaller than a width in the flow direction at an end of the slant portion on the one side of the facing direction.

17. The labyrinth seal according to claim 4, wherein:
the annular groove has a slant portion formed in at least one of a high-pressure-side portion and a low-pressure-side portion in the annular groove; and
the annular groove has a width in the flow direction at an end of the slant portion on the other side of the facing direction smaller than a width in the flow direction at an end of the slant portion on the one side of the facing direction.

18. The labyrinth seal according to claim 2, wherein:
the labyrinth seal comprises a plurality of unit structures adjacent to one another in the flow direction; and
each of the plurality of unit structures comprises an additional one of the step portion, an additional one of the high-pressure-side fin, an additional one of the low-pressure-side fin, and an additional one of the annular groove.

19. The labyrinth seal according to claim 3, wherein:
the labyrinth seal comprises a plurality of unit structures adjacent to one another in the flow direction; and
each of the plurality of unit structures comprises an additional one of the step portion, an additional one of the high-pressure-side fin, an additional one of the low-pressure-side fin, and an additional one of the annular groove.

20. The labyrinth seal according to claim 4, wherein:
the labyrinth seal comprises a plurality of unit structures adjacent to one another in the flow direction; and
each of the plurality of unit structures comprises an additional one of the step portion, an additional one of the high-pressure-side fin, an additional one of the low-pressure-side fin, and an additional one of the annular groove.

* * * * *